Sept. 21, 1943.   A. S. NEUBAUER   2,330,075
CRANK PIN TURNING DEVICE
Filed Nov. 27, 1939
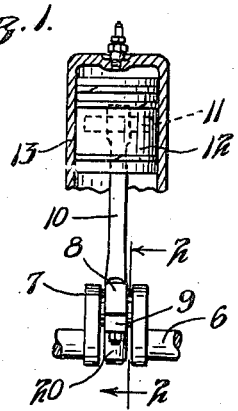
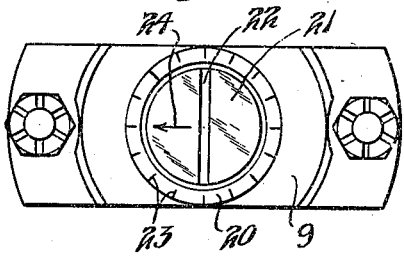
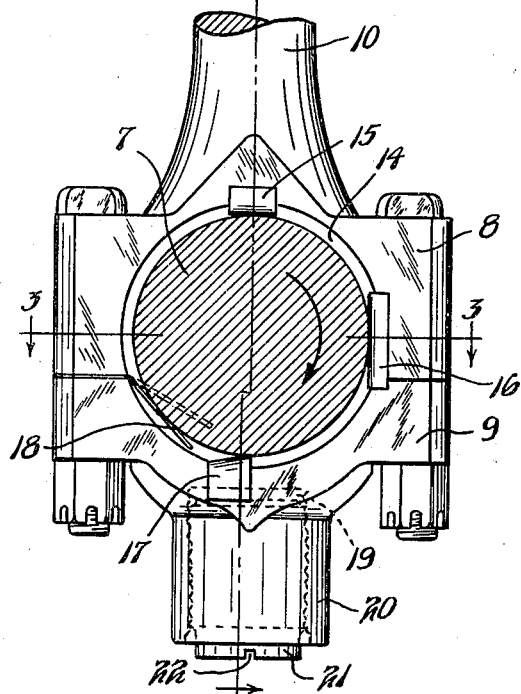
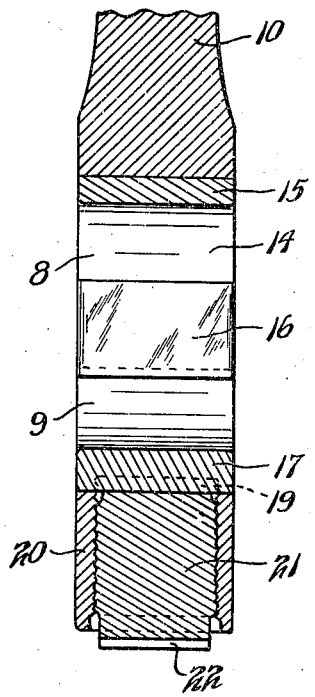
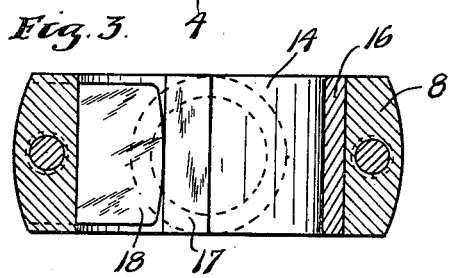
INVENTOR.
ALOYSIUS S. NEUBAUER
BY HIS ATTORNEYS.
Williamson & Williamson Patented Sept. 21, 1943

2,330,075

UNITED STATES PATENT OFFICE 2,330,075

CRANKPIN TURNING DEVICE

Aloysius S. Neubauer, Marble, Minn., assignor of one-fourth to Frank B. Colombo and one-fourth to Gerald A. Schedin, Marble, Minn.

Application November 27, 1939, Serial No. 306,321

2 Claims. (Cl. 82—4)

This invention relates to cutting or turning tools and is particularly adapted to tools used for turning crank pins on crank shafts in motor vehicle engines and other power devices.

After a crank shaft has been used for any length of time the crank pin will become worn and will get out of round. This is due to constant and repeated application of forces against the pin only at certain places on the circumference thereof. The shaft portions which rotate in the main or stationary bearings lie on the axis of rotation of the crank shaft and these can be turned down to make them round on an ordinary lathe with the usual turning equipment. This, however, is not true of the crank pins since they are offset from the axis of the shaft. Certain devices have been developed for reshaping crank pins but there have been certain disadvantages. Some of them comprise tool heads having portions cut out from their edges so that the tools can be slipped over the crank pins. Such tools are frequently operated by hand and whether they are hand operated or not they do not encircle the crank pin and there is insufficient bearing surfaces around the pin with the result that a cutting element used for turning the shaft will chatter and the cut will not be smooth. Other tools previously developed have utilized abrasive materials in the place of cutters. These are impractical for the reason that the crank pin may be worn to a smaller diameter at one portion than another along the axis of the pin. The abrasive will quickly tend to conform to the improper or worn shape of the crank pin and consequently the pin will not be turned to uniform diameter.

It is an object of my invention to provide a crank pin turning tool wherein the crank pin will be firmly positioned with respect to the cutter yet free to rotate so that a smooth cut on the pin will be secured.

Another object of the invention is to provide a crank pin turning tool wherein properly distributed bearings are provided and wherein a tool steel cutter is supported by the head of the tool to eliminate the disadvantages of tools utilizing blocks of abrasive.

A further object of the invention is to provide an adjustable cutter and micrometric means for indicating extent of adjustment of the cutter and resulting depth of cut on the pin.

A further object of the invention is to provide a crank pin turning tool which can be installed in an internal combustion engine so that the pin can be turned down while the crank shaft is in the motor.

These and other objects and advantages of the invention will more fully appear from the following description made in connection with the accompanying drawing, wherein like reference characters will refer to the same parts throughout the views, and, in which:

Fig. 1 is an elevation of my tool showing it in combination with an engine piston, a fragment of a cylinder and a portion of a crank shaft;

Fig. 2 is an enlarged fragmentary elevation of the head of my tool with a section of a crank shaft taken approximately on the line 2—2 of Fig. 1;

Fig. 3 is a transverse section taken approximately on the line 3—3 of Fig. 2;

Fig. 4 is a vertical section taken approximately on the line 4—4 of Fig. 2; and

Fig. 5 is a bottom plan view.

In Fig. 1 there is shown a portion of a crank shaft 6 with a crank pin 7 about which the head of my tool is positioned. The head comprises a pair of separable portions 8 and 9 and extending upwardly from the head portion 8 is a shank 10. The shank at its upper end is provided with an aperture adapted to receive the wrist pin 11 of a piston 12 which reciprocates in a cylinder 13. The upper end of the tool is not shown in detail since it is merely a member with an aperture therethrough and the wrist pin can be loosely received in the aperture. If desired, the upper end of the tool may be split as the lower head is to facilitate connecting of said upper end to the wrist pin.

Referring particularly to Fig. 2 the two tool head portions 8 and 9 define a relatively large aperture 14 which is adapted to receive the crank pin 7. The upper head portion 8 is provided with a block 15 which has a smooth bearing surface exposed in the aperture 14 and at the right-hand side of the head portion 8 is a second bearing block 16 which also has a bearing face exposed in the aperture 14. It will be seen that the bearing elements 15 and 16 are rigidly supported by the tool head and that they are positioned 90 degrees apart. This exact degree of spacing between the bearing blocks is not absolutely essential, but it is preferred that the spacing be approximately as shown to provide for smooth contact with the crank pin 7 and smooth relative movement of said crank pin relative to said bearings. In Fig. 4 it will be seen that the ends of the bearing blocks are rounded so that said blocks will fit into the portions of the crank pin much in the same manner as the ordinary connecting rod bearing.

Starting with the upper bearing 15 and following around the aperture 14 in a clockwise direction it will be found that the cutter element 17 is approximately 180 degrees from the first bearing block 15 and approximately 90 degrees from the second bearing block 16. In this case as well as in the case of the spacing of the two bearing blocks it is not necessarily essential that the cutter be spaced 180 and 90 degrees respectively from the bearing blocks 15 and 16, but it has been found that this spacing provides for smooth relative movement between the cutter head and the crank pin so that the cutter element will not dig into the pin during the cutting operation. Furthermore, this spacing has resulted in elimination of the tendency in other tools to accentuate the out of roundness of the crank pin.

Positioned rearwardly of the cutter and approximately 45 degrees therefrom and substantially opposite to the mid-point between the bearing blocks 15 and 16 is a resilient bearing element 18. This element as can be seen is clamped between the two halves of the cutter head with a portion extending into the aperture 14 at an angle constituting a chord of the circle described by said aperture. The dotted line position of the resilient bearing 18 is the position with no crank pin in the tool and the full line position of the resilient or free end of the bearing 18 is that position when the bearing is pressing against the crank pin 6. It will be seen that the resilient bearing 18 presses the crank pin upwardly on a diagonal and keeps the rigidly mounted bearings 15 and 16 in contact with the crank pin at all times.

The cutter 17 is mounted for axial sliding movement in the lower portion 9 of the tool head and the bottom of said cutter extends into a bore 19 which is formed in a downward extension 20 at the bottom of the tool head section 9. A plug or follower 21 is threaded into the bore 19 as indicated in Fig. 2, and the inner end of said plug bears against the bottom of the cutter 17. The plug 21 is provided with a kerf 22 so that it can be rotated with a screw driver or similar tool. Around the lower edge of the downward extension 20 I provide a series of graduations indicated at 23 and on the bottom end of the plug 21 is an arrow or other suitable indicator 24 which in combination with the graduations 23 indicates the amount of axial adjustment of the plug 21 and cutter 17. Thus it is possible to accurately gauge the amount of metal taken off of the crank pin during the reshaping operation. The graduations and arrow thus provide a micrometric indicator for the depth and extension of cut.

When the device is used in an internal combustion engine the connection of the upper end of the tool shank 10 to the wrist pin 11 provides a guide for the tool which is sufficiently stable to insure accurate and smooth cutting. As stated above, it is not necessary, however, to closely fit the wrist pin in the upper end of the tool since the working of the piston 12 in the cylinder 13 affords a sufficiently smooth guide to provide for extremely accurate and even cutting. As a matter of fact, it is possible to turn down a crank pin on a lathe with my tool by securing the head around the crank pin and permitting the other end of the shank to slide back and forth over a smooth plate positioned on the lathe bed. With such an arrangement the plate would be positioned to the right of the apparatus as viewed in Fig. 2 and the clockwise movement of the crank pin relative to the tool head and the drag produced by the cutter in its work will keep the other end of the tool in constant contact with a bearing plate such as I have described. It is this continuous pressure exerted during rotation of the crank pin which in conjunction with the crank pin bearing arrangement produces a smooth cut without the chattering incident to those hand operated tools heretofore used wherein the tool head is provided with a generally U-shaped cut out from one edge. Furthermore, the relationship between the various bearing contacts and the cutter will produce a cut which will take off high spots and produce a truly round cut whereas in the old types referred to it is not possible to secure the proper bearing distribution and tool guiding to secure a properly rounded cut.

It is unnecessary to provide tools of different lengths for each length of crank shaft throw and connecting rod measurement since the piston is not being operated under its normal conditions and it acts merely as a guide and can reciprocate through a different stroke than the ordinary engine stroke without effecting operation of the tool. It has been found that the crank shaft can be turned by hand or it has even been found possible to restore crank pins to roundness by installing the tool in the engine and rotating the shaft with a conventional engine starter.

In addition to the fact that a cutting tool will cut to the desired shape and not conform to the shape of the crank shaft as in the case of abrasive tools the operation is materially speeded up. In many cases it has been found that the crank shaft need be rotated no more than twelve to fifteen times and that the finished cut is sufficiently smooth to render polishing of the crank pin unnecessary.

It will, of course, be understood that various changes may be made in the form, details, arrangement and proportions of the various parts without departing from the scope of my invention.

What is claimed is:

1. A crank pin turning tool comprising, a head made up of a pair of separable portions and having means for tightly clamping them together about a crank pin, a cutter carried by a portion of said head, bearing elements carried by said head and adapted to guide said crank pin when being operated on by said cutter, and a resilient bearing member adapted to keep said first mentioned bearing elements in contact with said pin, said resilient bearing member including a relatively thin flat portion having a side face positioned to engage said crank pin, and said resilient bearing member including another portion positioned between and clamped by the separable portions of the head of said tool.

2. A crank pin turning tool comprising, a head portion made up of a pair of separable parts and shaped to fit relatively closely around a crank pin, a cutter member supported by one part of said head and extending inwardly therefrom to engage a crank pin received by said head, crank pin bearing elements supported by said head and positioned to engage said pin to hold said pin and head in proper relative positions for cutting, and a resilient bearing member carried by said head and adapted to engage a portion of said pin opposite said first mentioned bearing elements to force said pin toward said first mentioned bearing elements, said resilient bearing member having a flat portion of considerable surface area and adapted to lie tangentially of said crank pin while in engagement therewith, and said resilient bearing member having an anchoring portion positioned between said tool head parts and secured thereby.

ALOYSIUS S. NEUBAUER.